United States Patent [19]

Hammond

[11] 4,205,740

[45] Jun. 3, 1980

[54] PULSATING GRAVITY CONVEYOR WITH LOAD ALIGNMENT MEANS

[76] Inventor: Theodore A. Hammond, 1160 Edsel St., SE., Grand Rapids, Mich. 49508

[21] Appl. No.: 902,415

[22] Filed: May 3, 1978

Related U.S. Application Data

[63] Continuation-in-part of Ser. No. 567,608, Apr. 14, 1975, abandoned, which is a continuation-in-part of Ser. No. 408,275, Oct. 23, 1973, abandoned.

[51] Int. Cl.² .......................................... B65G 13/00
[52] U.S. Cl. .................................. 193/35 A; 104/135; 193/35 SS
[58] Field of Search ............... 193/35 R, 35 A, 35 SS, 193/37; 104/135; 198/780, 781, 782, 836; 214/84

[56] References Cited

U.S. PATENT DOCUMENTS

| 1,467,293 | 9/1923 | Matheson | 104/135 X |
|---|---|---|---|
| 2,572,325 | 10/1951 | Ernst | 198/836 X |
| 2,979,177 | 4/1961 | Sullivan | 193/35 A |
| 3,010,409 | 11/1961 | De Good et al. | 104/135 |
| 3,011,665 | 12/1961 | Wise | 193/35 SS X |
| 3,108,671 | 10/1963 | Fuka et al. | 193/35 A |
| 3,130,829 | 4/1964 | Long | 193/35 SS |
| 3,456,776 | 7/1969 | Viene | 198/836 X |

FOREIGN PATENT DOCUMENTS 954249  4/1964  United Kingdom ...................... 214/84

*Primary Examiner*—James L. Rowland
*Attorney, Agent, or Firm*—Blanchard, Flynn, Thiel, Boutell & Tanis

[57] ABSTRACT

A gravity-type roller conveyor having plural rollers mounted on an elongated support member which is movably positioned within an elongated frame member. The upper edges of the frame member have sidewardly extending flanges which define braking surfaces. An elongated hose is positioned in the bottom of the frame member and, when inflated, causes the support member and rollers to raise upwardly so that the rollers project above the braking surfaces. The hose, when at least partially deflated, causes the support member to move downwardly so that the rollers are positioned below the braking surfaces, whereby the articles supported on the rollers are lowered into engagement with the braking surfaces. A control device provides pressurized air to the hose in a pulsating manner to cause periodic raising and lowering of the rollers for controlling movement of the articles. Centering flanges, preferably fixed to the outer edges of the brake flanges, project outwardly and upwardly in an inclined relationship so that if the article moves sidewardly while being advanced along the rollers, then lowering of the article causes it to contact the centering flange and be shifted sidewardly so as to be recentered.

6 Claims, 5 Drawing Figures

PULSATING GRAVITY CONVEYOR WITH LOAD ALIGNMENT MEANS

CROSS-REFERENCE TO RELATED APPLICATION

This application is a continuation-in-part of my copending application Ser. No. 567,608 filed Apr. 14, 1975, now abandoned which in turn is a continuation-in-part of earlier application Ser. No. 408,275 filed Oct. 23, 1973, now abandoned.

FIELD OF THE INVENTION

This invention relates to an inclined gravity-type roller conveyor employing roller units which are cyclically raised and lowered to permit the intermittent controlled movement of articles, specifically pelletized loads, along a conveyor and, in particular, to an improved alignment structure associated with the conveyor for causing the palletized loads to be automatically recentered when the loads are lowered during each cycle of roller movement.

BACKGROUND OF THE INVENTION

Articles conveyed on inclined gravity-type roller conveyors over a substantial distance and slope accelerate as they advance along the conveyor and may attain a substantial velocity at the end of their traverse. The high velocity of the articles being conveyed is objectionable in that it presents various problems, such as the difficulty of stopping the articles, the damaging of the articles by impact with one another, and the tipping of the articles especially if they are relatively tall.

In an attempt to overcome the above problem, numerous gravity-type conveyors utilizing intermittently actuated brakes have been devised. However, conveyors of this type have had only limited commercial success.

One known gravity-type roller conveyor employing an intermittently actuated brake utilizes a plurality of rubber support rollers having internal brakes associated therewith for intermittently stopping the rollers. However, successful control of the rollers can be achieved only when the operating conditions are precisely controlled. When substantial temperature variations occur, the brakes do not always stop the rollers and thus proper control of the rollers, namely intermittent braking thereof, does not always result.

Another known roller conveyor uses an elongated brake member positioned below the rollers and moved upwardly by inflation of a flexible hose for engaging the rollers to periodically brake same. While this system is at least partially effective for controlling the rate of movement of the articles, nevertheless this system possesses undesirably structural and operational features. For example, the brake is applied only when the hose is inflated. Accordingly, when a failure in the inflating system or hose occurs, the brakes cannot be applied so that movement of the articles along the conveyor is uncontrolled. A further disadvantage is that the braking force applied to the rollers is determined solely by the pressure developed within the hose and by the relative clearances and distortions which occur throughout the system. The system clearances, distortions and hose pressure thus must be precisely controlled to result in the desired magnitude of braking.

To overcome the above disadvantages, Applicant devised an improved gravity-type roller conveyor utilizing an intermittently actuated roller system disposed for coaction with a stationary brake to provide for highly desirable speed control over heavy loads, specifically palletized loads, while additionally providing a fail-safe system. In this improved conveyor, the roller system is cyclically raised and lowered so that the loads are cyclically raised off of the stationary brake to permit a gravity-urged advance thereof along the conveyor, followed by lowering of the load onto the stationary brake, thereby achieving a high level of speed control over the loads.

While applicant's improved conveyor as above described has been observed to provide substantially improved speed control for heavy loads, such as palletized loads which may be in the order of several thousand pounds, nevertheless the mode of operation of this conveyor presents a further problem due to the fact that the rollers and the loads thereon are lifted upwardly during that portion of the cycle when the loads are permitted to advance along the conveyor. Because the loads are in this raised position during the advancing thereof, and inasmuch as loads often have a tendency to run crooked (that is, move sidewardly as they are being advanced along the conveyor), this improper tracking of the loads presents a serious problem in view of the continual raising and lowering of the loads during the normal conveyor operation. While conventional roller conveyors have traditionally been provided with upright side flanges adjacent the rollers for slidably guiding the conveyed articles and preventing sideward displacement thereof, nevertheless these upright guide flanges have long been recognized as undesirable since they create continual rubbing along one side of the article and hence not only create undesirable wear on both the flange and the article, but also introduce substantial undesired friction which undesirably impedes optimum operation of the conveyor. Further, use of such uprights flanges on applicant's conveyor, wherein the rollers and the loads are repetitively raised and lowered, would increase even further the undesirable wear and friction between the loads and the guide flanges, and would also greatly reduce the lifting capability of the roller system. Use of such guide flanges on a gravity conveyor employing a pulsating roller system which repetitively lifts and lowers is thus an unsatisfactory solution to the load misalignment problem.

Accordingly, it is an object of the present invention to provide an improved inclined roller conveyor of the type which permits for controlled intermittent movement of articles therealong by utilizing a stationary brake system positioned for direct engagement with the loads, with the movement of the loads being induced by a roller system which is periodically raised and lowered in a cyclical manner to cause corresponding lifting of the loads and re-engagement thereof with the stationary brake, and wherein the conveyor includes an improved alignment structure associated therewith which does not interfere with the free forward advance of the articles along the conveyor but which causes automatic recentering of the loads when they are being lowered toward the braking flanges to thereby correct for any misalignment which occurs during the step-like forward advances of the loads.

More specifically, the present invention provides an alignment system, as aforesaid, which preferably employs a pair of centering flanges which are fixed to and project outwardly and upwardly from the brake flanges so that the loads will be free of contact with the centering flanges during the normal forward advance along the conveyor, but in the event of any sideward misalignment of the load, then the lowering of the load toward the brake flanges will cause one side of the load to engage the respective centering flange, whereby the load will be automatically shifted sidewardly to effectively recenter same as it is deposited in engagement with the brake flanges. This thus prevents the load from dragging along the centering flanges during the normal forward advance of the load along the conveyor, thereby greatly minimizing wear and friction, while at the same time causing automatic engagement and recentering of only those loads which become misaligned or sidewardly displaced.

It is also an object of the present invention to provide an improved inclined roller conveyor of the gravity type having fail-safe brake means associated therewith for intermittently stopping the movement of the articles along the conveyor to control the movement rate, wherein the brake means includes an elongated brake rail disposed adjacent the rollers, wherein the rollers are movable between upper and lower positions disposed above and below the brake rail for enabling the conveyed articles to engage the brake rail when the rollers are in their lowered position, and wherein a control system causes the rollers to be periodically raised and lowered for causing the articles to be moved along the conveyor in an intermittent steplike manner to control the speed and movement thereof.

Other objects and purposes of the present invention will be apparent to persons acquainted with conveyors of this general type upon reading the following specification and inspecting the accompanying drawings.

Figure 1:
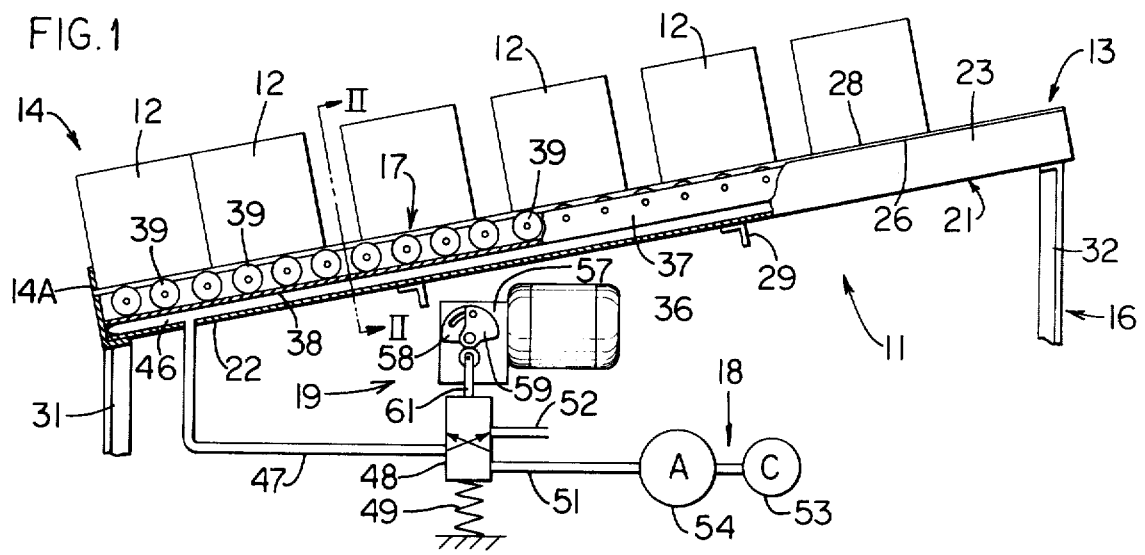
FIG. 1 is an elevational view of an improved conveyor, same being illustrated partially in cross-section.

Certain terminology will be used in the following description for convenience in reference only and will not be limiting. For example, the words "rightwardly", "leftwardly", "upwardly" and "downwardly" will refer to directions in the drawings to which reference is made. The word "forwardly" will refer to the normal direction of travel of articles along the conveyor, which direction is leftwardly in FIG. 1. The words "inwardly" and "outwardly" will refer to directions toward and away from, respectively, the geometric center of the conveyor and designated parts thereof. Said terminology will include the words specifically mentioned, derivatives thereof and words of similar import.

DETAILED DESCRIPTION

FIG. 1 illustrates an inclined gravity-type roller conveyor 11 for transporting articles 12, such as palletized loads, from an inlet or supply point 13 at the upper end of the conveyor to a discharge station 14 at the lower end of the conveyor. The conveyor extends at an angle of between 2° and 10° relative to the horizontal.

The conveyor 11 includes a stationary frame 16 which movably supports thereon at least one roller assembly 17, the conveyor 11 in the illustrated embodiment having two identical roller assemblies 17 thereon. The roller assemblies 17 are movable vertically relative to frame 16 by means of a power system 18. A control mechanism 19 is associated with the power system 18 for controlling the operation thereof.

Figure 2:
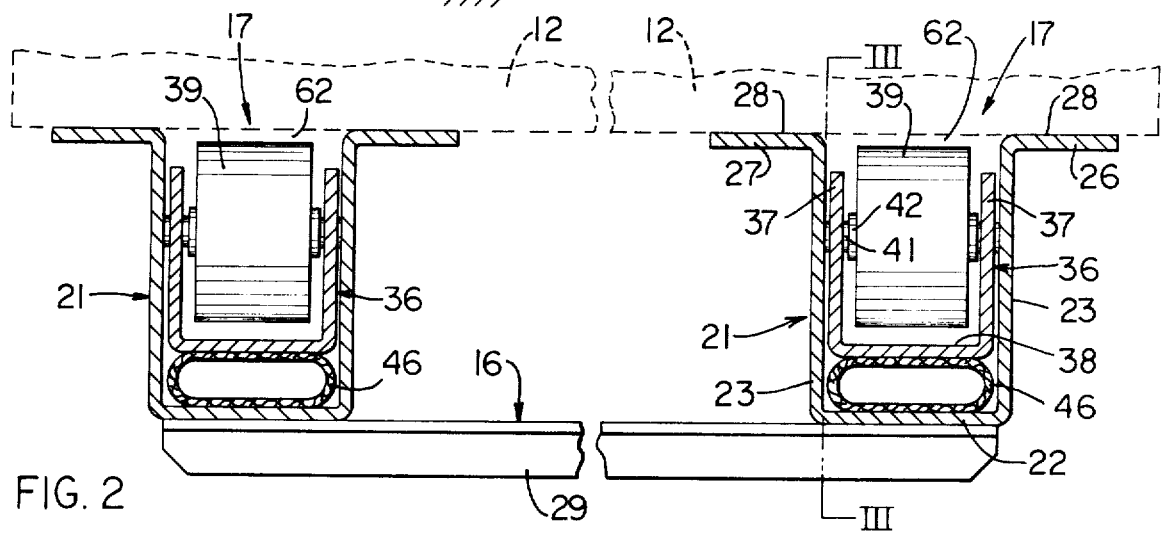
FIG. 2 is an enlarged, broken, sectional view of the conveyor taken substantially on the line II—II of FIG. 1.

The frame 16 includes a plurality, here two, of elongated frame members 21 extending longitudinally throughout the length of the conveyor, which frame members 21 are of an upwardly opening channel-shaped configuration (FIG. 2). Each channel member 21 includes a bottom wall 22 and a pair of substantially parallel sidewalls 23 projecting vertically upwardly therefrom. Frame 16 further includes a pair of elongated brake rails or members 26 and 27 positioned adjacent each frame member 21 and extending longitudinally therealong. The brake rails 26 and 27 are disposed adjacent the upper edges of the sidewalls 23 and are fixed relative thereto. The brake rails 26 and 27 define substantially flat upper braking surfaces 28. The channel members 21 are fixedly interconnected by any suitable structure, such as intermediate connecting members 29. The frame members 21 in turn are supported in an inclined position by conventional legs or supports 31 and 32.

The roller assembly 17 includes an elongated roller support member 36 which is of an upwardly opening channel-shaped configuration and includes a pair of opposed and substantially parallel sidewalls 37 projecting upwardly from a base wall 38. The roller support channel 36 has a width slightly less than the width between the internal surfaces of the sidewalls 23 to enable the channel 36 to be slidably disposed within the channel 21.

The roller support channel 36 rotatably supports thereon a plurality of conventional cylindrical rollers 39, which rollers 39 are disposed in spaced relationship along the longitudinal length of the channel 36 substantially as illustrated in FIG. 1. Each roller 39 is mounted on a support shaft 41 by conventional antifriction bearings 42. The shaft 41 projects outwardly beyond opposite sides of the roller 39 so as to be supported within opposed openings 43 formed in the opposite sidewalls 37 of the channel 36.

To permit roller assemblies 17 to be vertically raised and lowered relative to frame members 21, the conveyor is provided with the power system 18 which includes an elongated flexible hose or conduit 46 positioned within each of the channel-shaped frames 21. The conduit 46 is positioned on the bottom wall 22 and is disposed directly beneath the roller channel 36, the conduit 46 thus being confined between the bottom walls 22 and 38. The conduit 46 is alternately expanded and contracted by means of a pressure fluid, such as pressurized air. A conduit or pipe 47 is connected to the hose 46 for permitting the pressurized fluid to be supplied to or withdrawn from the interior of the hose 46. The flow of fluid through the conduit 47 is controlled by a conventional shiftable valve 48 which, in the illustrated embodiment, comprises a conventional two-way valve which is normally urged by a spring 49 into a first position permitting the discharge of pressure fluid from the conduit 47 into a suitable discharge conduit 52. The conduit 47 is also adapted to communicate with a supply conduit 51 which has associated therewith a suitable power source, such as a compressor 53. When a compressible pressure fluid is used for controlling the expansion and contraction of the hose 46, then the power system also preferably includes a conventional accumulator 54 for storing therein the pressure fluid.

To permit shifting of the valve 48 into a position permitting the flow of pressure fluid into the hose 46 for expanding same, there is provided the adjustable control device 19 which, as illustrated in FIG. 1, includes a conventional electric motor 56 drivingly connected to a conventional gear reducer 57, the output shaft of which has an adjustable cam arrangement mounted thereon for rotation therewith. The adjustable cam arrangement includes a plurality of lobes 58 and 59 which can be angularly adjusted relative to one another so as to adjust the arcuate extent of the resultant cam assembly. The cam lobes are disposed for engagement with a cam follower 61 which causes the valve 48 to be shifted in opposition to the urging of the spring 49.

Figure 3:
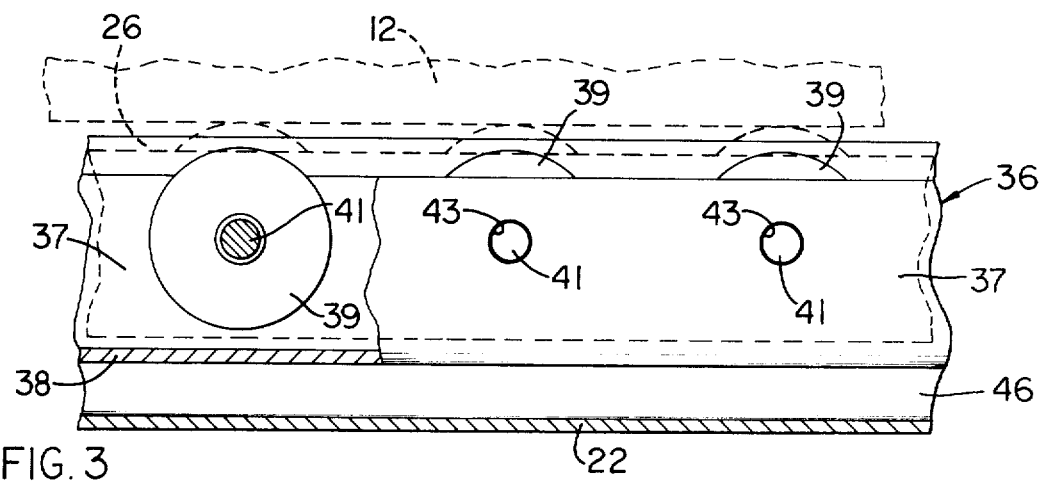
FIG. 3 is a sectional view taken along the line III—III of FIG. 2.

Due to the rotation of the cam lobes 58 and 59, valve 48 is periodically shifted so as to intermittently couple the conduit 47 to the supply conduit 51 and the exhaust conduit 52. This results in hose 46 being alternately and intermittently expanded and contracted. The hose 46 when in its expanded or partially inflated condition causes the roller channel 36 to be moved upwardly within the frame member 21 so that the uppermost point on the periphery of the rollers 39 is disposed slightly above the braking surfaces 28, as illustrated by the dotted line positions of the rollers as shown in FIG. 3. This movement of the rollers above the brake surfaces 28 causes the rollers to engage the articles 12 and lift same upwardly out of engagement with the brake surfaces 28, thereby enabling the articles to move freely along the inclined conveyor due to the effect of gravity. On the other hand, during the intervals when the valve 48 is shifted by spring 49 so as to cause conduit 47 to communicate with discharge conduit 52, then the hose 46 is at least partially deflated so as to cause a lowering of the roller assembly 17 into the position illustrated by solid lines in FIGS. 2 and 3. With the roller assemblies 17 in their lowered position, the uppermost peripheral extent of the rollers 39 is disposed a slight distance below the brake surfaces 28. This thus results in the articles 12 being engaged with the brake surfaces 28, there being a small clearance space 62 between the rollers 39 and the articles 12.

In operation, the conveyor is initially in a state wherein the hose 46 is deflated, and the roller assemblies 17 will be in their lowered positions as illustrated in FIG. 2. Accordingly, articles 12 deposited on the conveyor 11, as by means of a fork lift, adjacent the inlet station 13 will be deposited directly on the brake surfaces 28 and will remain stationary.

Since motor 56 is normally continuously energized, the cam lobes 58 and 59 are rotated and cause the cam follower 61 to be cammed outwardly in opposition to the urging of the spring 49. This shifts the valve 48 so that supply conduit 51 communicates with conduit 47 so that pressurized air is supplied to the hose 46 to cause at least partial inflation thereof. This causes the hoses 46 to expand and thus raise the roller assemblies 17 upwardly until the upper surfaces of the rollers 39 project upwardly beyond the brake surfaces 28. This results in the articles 12 being lifted upwardly out of engagement with the brake surfaces 28, whereupon the slope of the conveyor 11 and the effect of gravity on the articles 12 causes the articles 12 to freely move downwardly along the rollers 39 in a direction toward the discharge location 14.

However, the cam lobes 58 and 59 continue to rotate and are moved out of engagement with the follower 61, whereupon the spring 41 shifts the follower 61 upwardly, whereby valve 48 shifts so that conduit 47 is connected with the discharge conduit 52. The pressurized fluid within the hoses 46 is thus discharged so that the hoses partially deflate, thereby causing the roller assemblies 17 to be lowered into their initial positions as illustrated in FIG. 2, in which positions the individual rollers 39 are disposed below the brake surfaces 28. This lowering of the rollers 39 causes the articles to be moved downwardly to engage the brake surfaces 28, thus resulting in a stopping of the articles so long as the roller assemblies 17 are maintained in their lowered positions.

Due to the continued rotation of the cam lobes 58 and 59, the valve 48 will be continuously shifted between the supply and exhaust conduits 51 and 52 so that the hoses 46 will likewise be intermittently and periodically inflated and deflated in a pulsating manner. This results in the roller assemblies 17 being intermittently raised and lowered in a periodic or pulsating manner. The articles 12 are thus intermittently engaged with and supported on the rollers 39 for short intervals of time, with the articles 12 being stationarily supported on the brake surfaces 28 during the intervening intervals of time. The articles 12 are thus moved in an intermittent steplike manner from the inlet end toward the discharge end of the conveyor.

When the frontmost article 12 reaches the discharge end of the conveyor, same engages a stop 14A which maintains the frontmost article in a storage position on the conveyor. The succeeding article 12, as it approaches the discharge end of the conveyor, contacts the stopped frontmost article so that a plurality of articles can thus be stored on the conveyor, which storage is illustrated by the two leftmost articles 12 in FIG. 1. When removal of an article 12 from the conveyor is desired, then the frontmost article can be removed by means of a forklift or other removing device. This permits the remaining stored articles to be intermittently advanced until the next article engages the stop 14A. In this manner, the articles can be easily handled on a "first in—first out" basis, while at the same time permitting simple storage of the articles on the conveyor for any desired period of time. It will be appreciated that the conveyor can also be used where continuous conveying of articles therealong is required.

A significant advantage of the conveyor system described above resides in the fact that same functions as a fail-safe system. Particularly, if a failure should occur within the power system 18, such as due to a failure of the compressor or due to a rupture of one of the supply lines, such as either the hose 46 or the line 47, then the hoses 46 will automatically deflate so as to result in the roller assemblies 17 being lowered into their inactive positions. The articles 12 will automatically be deposited on the brake surfaces 28, thereby preventing any runaway or uncontrolled movement of the articles 12.

While the control system as disclosed above utilizes a shiftable valve controlled by a mechanical timer, it will be appreciated that the control system may constitute any conventional control structure, such as adjustable mechanical or pneumatic timers.

The conveyor system of the present invention has been found particularly advantageous for controlling the movement of pallets which are loaded with goods thereon since the movement of such pallets must be precisely controlled in order to prevent shifting or dislodging of the goods thereon. Due to the precise control over the intermittent steplike movement of the pallets as provided by the conveyor system of the present invention, the pallets can thus be freely moved down an incline by means of a gravity-type conveyor as disclosed above.

Figure 4:
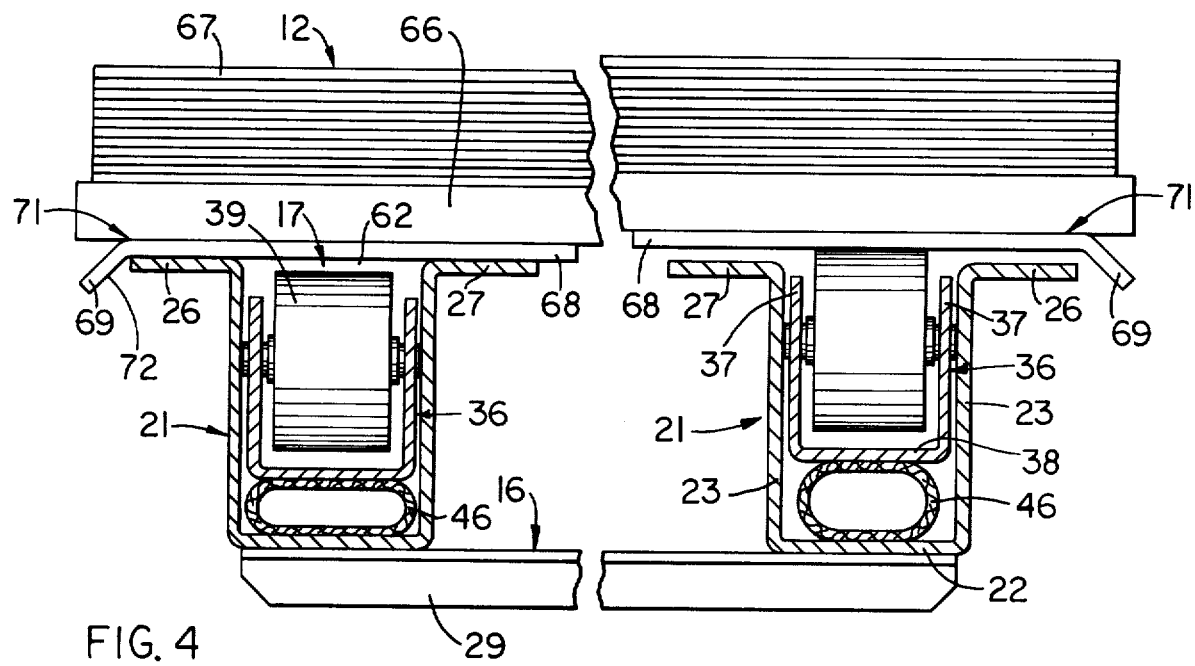
FIG. 4 is an enlarged, broken, sectional view similar to FIG. 2 but illustrating the conveyor having alignment structure between the conveyor and the articles.

FIG. 4 illustrates thereon the roller conveyor incorporating therein an alignment structure 71 located between the transported articles 12 and the roller assemblies 17. As noted above, this conveyor is particularly desirable for transmitting articles 12 which comprise palletized loads. Thus, FIG. 4 illustrates the article 12 comprising a palletized load formed by a conventional pallet 66 which is of rectangular configuration and supports thereon a plurality of individual goods or articles 67, such as sheets of vinyl or the like. The pallet 66 is of conventional construction and may be formd from wood, metal or other conventional materials.

According to the present invention, the alignment structure 71 continuously and automatically recenters the palletized load 12 as it is intermittently lifted and advanced during its gravity-induced movement along the conveyor, thereby correcting for any sideward misalignment of the load and thus preventing the load from moving sidewardly off of the conveyor as it is transported therealong.

The alignment structure 71, in the FIG. 4 embodiment, comprises a flat metal plate portion 68 which is fixedly secured to the bottom of the pallet 66, as by nails, rivets or the like. This plate portion 68 preferably extends the full length of the pallet and has a width sufficient to extend across the channel member 21 so that the plate portion 68 engages both braking flanges 26 and 27 when the rollers 39 are in their lowered position (as shown on the left side of FIG. 4). However, when the hose 46 is inflated to cause the rollers 39 to be lifted upwardly, then the rollers 39 will engage the plate portion 68 (as illustrated on the right side of FIG. 4) to permit gravity-induced movement of the palletized load 12 along the conveyor.

A centering flange 69 is fixedly secured to the outer edge of plate portion 68 and extends downwardly to overlap the free edge of the outer brake flange 26. The flange 69 projects downwardly a sufficient distance to overlap the brake flange 26 when the rollers are raised, as illustrated on the right side of FIG. 4, thereby preventing the palletized load from moving sidewardly an excessive distance which would prevent proper operation of the centering flanges.

The flange 69 preferably extends downwardly and outwardly relative to the horizontal at an angle of approximately 45°, whereby the lower surface 72 of flange 69 functions as a wedge or camming surface to thereby result in recentering of the palletized load 12 on the conveyor. If the palletized load should tend to move sidewardly on the conveyor as it moves downwardly therealong, then when the hose is deflated so as to result in lowering of the palletized load, the lower camming surface 72 will engage the free end of the brake flange 26 so that the palletized load will be shifted sidewardly and recentered as it is lowered into engagement with the braking flanges. For this purpose, the two flanges 69 as located on the opposite sides of the pallet are spaced apart by a distance (as measured between the points where flanges 69 are joined to plates 68) which is only slightly greater than the distance between the free ends of the brake flanges 26, whereby the pallet will thus be substantially recentered relative to the longitudinal centerline of the conveyor each time the pallet is lowered into engagement with the braking flanges.

Figure 5:
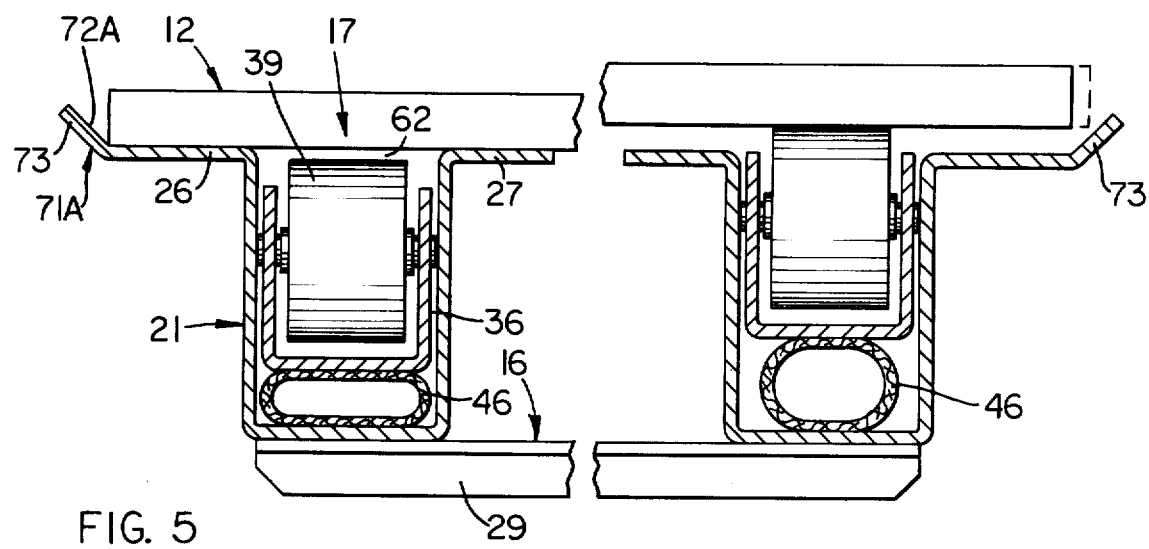
FIG. 5 is a fragmentary sectional view similar to a portion of FIG. 4 but illustrating the conveyor with the preferred alignment structure thereon.

FIG. 5 illustrates a preferred embodiment wherein the alignment structure 71A is formed by a centering flange 73 which is fixed to and extends longitudinally along the outer end of the braking flange 26 and projects upwardly and outwardly therefrom. The flange 73, as illustrated, extends upwardly and outwardly at an angle of approximately 45° relative to the horizontal plane defined by the braking flange 26 and defines on the upper surface thereof a camming or wedge surface 72A. Preferably the flange 73 projects upwardly at an even steeper angle, such as approximately 60°. The flange 73 functions in a manner similar to the flange 69 (FIG. 4) for causing automatic centering of the palletized loads 12.

Since each of the outer braking flanges 26 will have a similar centering flange 73 associated therewith, which centering flange projects upwardly through a distance greater than the vertical lifting of the pallet 12, the pallet 12 will be prevented from moving sidewardly relative to the conveyor through any great extent. At the same time, when a palletized load is lowered into engagement with the brake flanges, if the load is slightly off center (as indicated by dotted lines on the right side of FIG. 5), then the corner of the pallet will engage one of the camming surfaces 72A which will force the pallet sidewardly during the lowering thereof by the rollers so as to substantially recenter the pallet relative to the longitudinally extending centerline of the conveyor.

The operation of the centering flanges 73 is particularly desirable inasmuch as they will contact only those pallets which move sidewardly during their incremental forward advance, and this contact between one of the flanges 73 and the edge of the pallet will normally occur only when the pallet is being moved downwardly into engagement with the braking surfaces. The actual contact between the pallet and one of the centering flanges is thus of extremely short duration. This greatly minimizes pallet wear and application of frictional forces on the pallet, so as to not interfere with the desired flow of pallets along the conveyor. More specifically, during each cycle, the raising of the rollers causes each pallet to be lifted upwardly, whereupon the pallet is thus positively positioned so as to be spaced from and hence out of contact with the flanges 73. Accordingly, during the limited forward advance of the pallet downwardly along the conveyor, the pallet may tend to move sidewardly a limited extent but still normally remains out of contact with the flanges 73. However, when the roller assembly is lowered causing a corresponding lowering of the pallet, then any pallet which may have become slightly misaligned will then contact one of the centering flanges 73 which cams that respective pallet sidewardly to substantially recenter the pallet as it is being lowered into engagement with the braking surfaces. The magnitude and duration of contact between the flanges 73 and any of the pallets is thus greatly minimized, while at the same time the loaded pallets are efficiently and effectively automatically recentered to insure that a proper control of the pallets is achieved.

As illustrated in FIG. 5, the outer channel-shaped frame 21 is preferably formed integrally in one piece with both the brake flanges 26-27 and the centering flange 73, such as by being roll-formed from plate material. While the flanges 73 are illustrated as being attached to the outer ends of the outer brake flanges 26, it will be appreciated that these flanges 73 could alternately be attached to the free edges of the inner brake flanges 27 depending upon the configuration of the pallet with which the conveyor is utilized.

The alignment structure of FIG. 5 is preferred since it is usable with conventional pallets. The FIG. 4 embodiment, on the other hand, is undesirable in many instances as the pallets must be specially modified and, when so modified, are no longer of multi-purpose use since many other usages would damage the alignment flanges. For this reason, the FIG. 4 embodiment is normally practical only in situations where a special conveyor pallet is used, normally referred to as a "slave" pallet, which slave pallet is used solely in association with the conveyor and in turn has a conventional loaded pallet positioned thereon.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a fail-safe gravity-type roller conveyor for permitting intermittent controlled movement of articles, such as palletized loads, therealong, comprising:
    elongated stationary frame means;
    first and second identical elongated roller assemblies mounted on said frame means for vertical movement relative thereto, said first and second roller assemblies extending longitudinally of said conveyor in spaced but parallel relationship so as to have said articles supported thereon;
    each said roller assembly including elongated support means extending longitudinally of said conveyor and a plurality of nonpowered rollers mounted on said support means for rotation about their respective horizontal axes, said rollers being of relatively short axial length in contrast to the articles being conveyed along the conveyor and being spaced apart in the longitudinal direction of said support means, said rollers having their upper surfaces disposed on a declining plane which extends at an acute angle so as to permit said articles to move by gravity along said roller assemblies;
    braking means for controlling the gravity-induced movement speed of said articles along said roller assemblies, said braking means being stationarily fixed relative to said frame means and extending longitudinally therealong;
    first and second lifting means coacting between said frame means and said first and second roller assemblies, respectively, for causing synchronous, intermittent and periodic vertical reciprocating movement of said first and second roller assemblies in a cyclic manner between a raised position permitting gravity-urged movement of said articles along said roller assemblies and a lowered position wherein the articles are stopped by said braking means, said first and second lifting means causing the respective first and second roller assemblies to automatically move into said lowered position upon failure of either of said lifting means so that said braking means directly engage said articles;
    said frame means including a pair of elongated upwardly opening channel-shaped frame members extending longitudinally of said conveyor and being disposed in spaced but parallel relationship, and said support means as associated with each of said roller assemblies comprising an elongated upwardly opening channel-shaped support member having said plurality of rollers disposed therein and rotatably supported thereon, each said channel-shaped support member being vertically slidably positioned within and closely confined between the sidewalls of one of said channel-shaped frame members so that the individual roller assemblies can be raised and lowered relative to said frame members;
    each said lifting means including elongated flexible conduit inflatable with a pressure fluid and positioned within the bottom of one of said channel-shaped frame members, the respective channel-shaped support member being supported upon said flexible conduit whereby inflation of said conduit causes the respective roller assembly to be moved into its raised position while at least partial deflation of said conduit causes said roller assembly to be moved into its lowered position;
    control means operatively interconnected to both of said first and second lifting means for causing cyclic actuation thereof to cause said first and second roller assemblies to synchronously vertically reciprocate between said raised and lowered positions in a repetitive manner;
    said braking means including an elongated sidewardly projecting brake flange fixedly connected to each of said channel-shaped frame members and extending longitudinally therealong, said brake flanges having upper surfaces thereon defining braking surfaces disposed for direct engagement with said articles when said roller assemblies are moved into said lowered position; and
    recentering means fixed relative to said frame means for automatically causing said articles, if they become sidewardly displaced during the conveying thereof, to be substantially recentered relative to the longitudinally extending centerline of said conveyor, said recentering means including a pair of opposed centering flanges which are inclined in opposite directions at a substantial angle with respect to both the horizontal and vertical, each of said flanges extending longitudinally of and being fixedly related to a respective one of said channel-shaped frame members and disposed for direct engagement with said articles, said flanges being positioned wherein they are normally spaced from and out of engagement with said articles when the articles are raised by the roller assemblies and permitted to movably advance along said conveyor, said flanges having the upper edges thereof at an elevation above the upper surfaces of the rollers when the latter are in said raised position, and said articles directly engaging one of said flanges only when said article is sidewardly displaced relative to the longitudinal centerline of said conveyor and only when said article is being lowered back into engagement with said braking surfaces, whereby the engagement between the sidewardly displaced article and the centering flange causes sideward camming of the article to substantially recenter same on the conveyor so that the article is again free of engagement with said flanges when again lifted by said lifting means.

2. A roller conveyor according to claim 1, wherein each of said centering flanges is fixedly connected to the outer edge of and extends longitudinally along a respective one of said brake flanges, said centering flange projecting outwardly and upwardly in inclined relationship to the respectively adjacent braking surface.

3. A roller conveyor according to claim 2, wherein each of said channel-shaped frame members has a pair of said elongated brake flanges fixed thereto and extending longitudinally thereof, said brake flanges being fixed to the upper edges of said channel-shaped frame member and projecting sidewardly in opposite directions away from said frame member, and said centering flange being fixedly connected to the outer edge of the brake flange which projects sidewardly toward the outside of said conveyor, whereby the pair of centering flanges are positioned adjacent the opposite outer sides of the conveyor so that the articles are positioned therebetween.

4. In a fail-safe, gravity-type roller conveyor for permitting intermittent controlled movement of articles therealong, comprising:

elongated frame means mounted on an incline;

an elongated roller assembly movably mounted on said frame means for vertical movement relative thereto, said roller assembly being adapted to have said articles supported thereon and including elongated support means and a plurality of spaced nonpowered rollers mounted on said support means for rotation about their respective horizontal axes, said rollers having their upper surfaces disposed on a declining plane which extends at an acute angle relative to the horizontal so as to permit said articles to move by gravity along said roller assembly;

braking means positioned for direct engagement with said articles for controlling the gravity-induced movement speed of said articles along said roller assembly, said braking means including elongated rail means fixed to said frame means and extending longitudinally therealong, said elongated rail means having a braking surface defined by the upper surface thereof;

lifting means coacting between said frame means and said elongated roller assembly for causing intermittent and periodic vertical reciprocating movement of said roller assembly in a cyclic manner between a raised position permitting gravity-urged movement of said articles along said roller assembly and a lowered position wherein the articles are engaged with said braking surface, said lifting means causing said roller assembly to automatically move into said lowered positions upon failure of said lifting means so that said braking means positively engage and stop said articles;

control means operatively interconnected to said lifting means for causing cyclic actuation thereof to cause said roller assembly to vertically reciprocate between said raised and lowered positions in a repetitive manner; and recentering means coacting between said conveyor and the articles being moved therealong for automatically causing the articles to be substantially sidewardly recentered relative to the longitudinal extending centerline of the conveyor each time the articles are lowered by the roller assembly, said recentering means including a pair of opposed centering flanges which extend in the longitudinal directions of said conveyor, said centering flanges being spaced apart and being oppositely inclined at a substantial angle with respect to both the horizontal and vertical, said centering flanges having a height which is greater than the height between said raised and lowered positions and being effective only when a sidewardly displaced article is being lowered by the roller assembly toward the brake surface to cause sideward camming of the sidewardly displaced article to substantially recenter same relative to the longitudinal centerline as the article is lowered.

5. A conveyor according to claim 4, wherein said lifting device includes an elongated flexible conduit inflatable with a pressure fluid and positioned between said frame means and said support means whereby inflation of said conduit causes said roller assembly to be moved into its raised position while at least partial deflation of said conduit causes said roller assembly to be moved into its lowered position.

6. A conveyor according to claim 4, wherein said centering flanges are fixedly connected to the frame means.

* * * * *